Nov. 9, 1948.                    C. H. WOOLSON                    2,453,482
                                UNIVERSAL DRILL JIG
Filed Sept. 14, 1946                                          2 Sheets-Sheet 1

INVENTOR:
CHARLES H. WOOLSON,
BY
ATTORNEYS

Nov. 9, 1948.　　　　C. H. WOOLSON　　　　2,453,482
UNIVERSAL DRILL JIG
Filed Sept. 14, 1946　　　　　　　　　　　　2 Sheets-Sheet 2
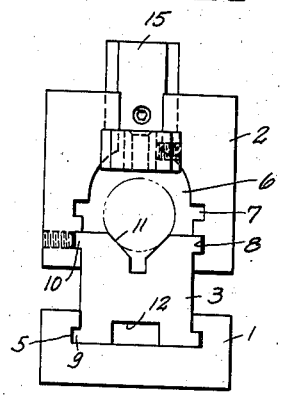
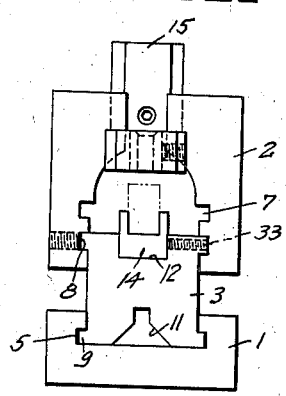
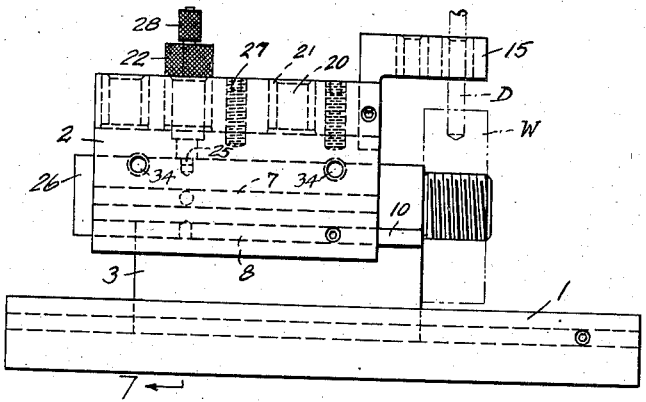
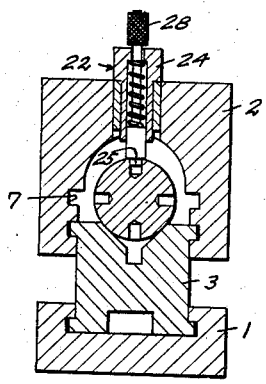
INVENTOR:
CHARLES H. WOOLSON,
BY
ATTORNEYS.

Patented Nov. 9, 1948

2,453,482

UNITED STATES PATENT OFFICE 2,453,482

UNIVERSAL DRILL JIG

Charles H. Woolson, Syracuse, N. Y.

Application September 14, 1946, Serial No. 697,029

1 Claim. (Cl. 77—62)

This invention relates to drill jigs and has for its object a universal drill jig adjustable for holding work-pieces of different sizes and shapes for quickly performing drilling operations on the same. Oftentimes, it is necessary to drill holes in small quantities of work where it is impractical to build special jigs, as for mass or large quantity production. This universal fixture is particularly adaptable or adjustable to hold different work-pieces of different size or shapes or contour as round or square, while holes are being drilled therein, or is quickly adjustable for small quantities of work-pieces instead of making a special fixture for each different form of work-piece when the necessity arises.

The invention consists in the novel features and in the combinations and constructions hereinafter set forth and claimed.

In describing this invention, reference is had to the accompanying drawings in which like characters designate corresponding parts in all the views.

Figure 1 is a plan view of this universal drill jig.

Figure 2 is a side elevation, partly broken away and partly in section.

Figure 3 is an end elevation looking to the left in Figure 2.

Figures 4 and 5 are end elevations, on a reduced scale, similar to Figure 3, showing the adjustment of the work holding block for receiving round articles and rectangular articles respectively of various sizes and also showing the carriage as adjusted for holding larger articles than by the adjustment shown in Figure 3.

Figure 6 is an elevation on a reduced scale of the jig where the work-piece is mounted on an indexible work holder.

Figure 7 is a sectional view taken on the plane of line 7—7, Figure 6.

This universal drill jig includes generally a base, a drill guide carriage and a reversible work holder block, the block having ways slidably interfitting with ways of the base and of the carriage and reversible to interlock the ways interfitting with the base with the ways interfitting with the carriage, and vice-versa, and the block having work receiving grooves or channels of different contour on opposite sides thereof arranged to be selectively brought into position opposed to the carriage upon reversing of the block. The jig also includes a work holder on which the work is mountable, which work holder is held between the block and the carriage and indexible about an axis to index the work to locate radial holes to be drilled in the work.

1 designates the base; 2 the carriage, and 3 the reversible work holding block between the base and the carriage 2. The base is formed with a channel 4 in its upper face, the side walls of which are provided with a set of undercut, as square, ways 5. The carriage 2 is formed with a recess or channel 6 extending lengthwise thereof, the side walls of which are formed with ways of the same size and configuration as the ways 5. There are a plurality of such sets of ways 7 and 8 located to hold the carriage at different elevations for work of different sizes. The block 3 is formed at its opposite or upper and lower sides with sets of complemental external ways 9, 10, the block 3 being reversible to bring the ways 9 into either sets of ways 7 or 8 of the carriage, and the ways 10 of the block into the ways 5 of the base.

The block 3 is provided with grooves or work receiving channels 11 and 12 of different cross-section, here shown as V-shaped and square respectively located in the opposite faces of the block, that is, in the upper and lower faces between the ways 10 and the ways 9. Also, an adjustable abutment 13 is mountable on the base 1 in the ways 5 thereof to different positions along the same. The V-shaped grooves 11 are for the purpose of holding round pieces of work or a round index member carrying the work, as will be presently described, and the square recesses are for receiving a square piece of work and also adapters, as 14 (Figure 5) fitting in the channels 12 for holding square or rectangular pieces of smaller size, or in other words, for reducing the size of the work receiving channel or groove. The block 3 is assembled on the base in different positions by sliding it endwise into the channel 4 with the ways 9 or 10 of the block interfitting the ways 5 of the base. When the ways 9 of the block are interfitted with the ways 5 of the base, the ways 10 of the block may be interfitted with the ways 7 or the ways 8 of the carriage 2. For a piece of small diameter, the ways 9 or 10 are fitted into the ways 7 of the carriage 2, as seen in Figure 3. When a work-piece of larger diameter is to be operated upon, the ways 10 of the block are interfitted in the ways 8 of the carriage 2, as seen in Figures 4 and 5. The carriage 2 is provided with a vertically-movable sub-carriage 15 overhanging one end of the carriage 2 and connected thereto by dove-tail ways at 16, the carriage 15 being held in different adjusted positions toward and from the block 3 by means of set screw 17. This sub-carriage is also reversible from the position shown in Figures 1 to 5 inclusive to the position shown in Figure 6. In other words, the sub-carriage 15 is L shaped and in the position illustrated in Figures 1 to 5 inclusive, is shown as arranged with the L formation in upright position, while in Figure 6, as in inverted position. The sub-carriage 15 is shown as provided with openings 18 through which the drills are guided. The openings may be provided with drill bushings 19 of different sizes. The main body of the carriage 2 is also formed with openings 20 and drill bushings or liners 21 therein, and these openings may be for guiding drills but are also for receiving an adjustable indexing device 22 operable to adjust and hold the work in different radial positions relative to the drill. The indexing device includes a spring-pressed pin 23 located in a body 24 fitted in any one of the holes 20 or the bushing therein, the pin having its end 25 arranged to enter any one of a series of holes in an index bar or member, as 26, which is clamped, preferably rotatably, between the carriage 2 and the block 3, as by clamping screws 27.

The work-piece itself is, in some operations, as in Figure 2, clamped by these screws 27, that is, when no indexing operation is to be performed. In Figure 6, the work designated W is shown as a collar mounted or threaded on the end of the index member 26, and when a hole is drilled by the drill D, in the periphery of the work W, and the drill withdrawn, the index plunger is withdrawn by means of its knurled end 28 against its spring and the index bar 26 turned until another hole comes into alinement with the plunger 25 and then the plunger released and the second drilling occurs. Some collars or pieces of work may require two diametrically opposite index holes, others a different number, as four, six, etc. equally-spaced holes. Hence, this index member or bar 26 may be provided with different series of holes, each series having a different number of holes along the same and the index member 22 may be located in any one of the holes 20 to register with a particular series of holes in the index member.

The holes for guiding the drill are arranged radially relatively to the axis of the work-piece clamped between the block 3 and the carriage 2, so that the holes to be drilled are radial holes. The block 3 is held in its adjusted position along the ways of the base 1 by suitable means, as set screws 30; the carriage 2 held in its adjusted position relatively to the block 3 by set screws 31, the sub-carriage 15 is held snugly in its ways by a set screw 32 in conjunction with the set screw 17 which holds the sub-carriage at different elevations. The adapter 14 is held tightly in the groove 12 by a set screw 33. The carriage 2 is provided with tapped holes 34 for securing it, when desired, to a bracket, fixture or other part.

In operation, the block 3 is mounted in the base with the work clamped by the screws 27 or one of them and in such position to locate the hole or holes to be drilled relatively to the bracket guide holes 18. When so located, the work abuts against the stop 13. When an indexing operation is to be performed, the work (Figure 6) abuts against the end of the member 26 to locate the holes to be drilled, the member 26 then having been adjusted and clamped between the carriage 2 and the block 3.

Owing to the reversing of the block having different shaped grooves for round or square pieces and adjusting of the block to different elevations, the jig is adaptable for use on stock of different diameters and shapes, as round, square or rectangular, and the drill guide carriage may be adjusted so as to locate the drills relatively to the work. Also, owing to the indexing device, the work may be provided with radial holes spaced equidistant apart and different distances apart for different work-pieces.

The term "drill jig" is used for brevity's sake. It is equally useful for tapping and other operations.

What I claim is:

A universal drill jig including a base, a carriage, drill guide openings, the block being adjustable lineally along the ways of the base, and the carriage adjustable lineally along the ways of the block to locate drill openings relative to the work between the carriage and the block; a reversible work holder block between the base and the carriage and having ways slidably interfitting with ways of the base and of the carriage and reversible to interlock the ways interfitting with the base with the ways interfitting with the carriage and vice-versa, the block having work receiving channels of different contour on opposite sides thereof arranged to be alternately brought into position opposed to the carriage upon reversing of the block, the carriage having a plurality of duplicate ways for coacting with the ways of the block and arranged to space the block different distances from the carriage, whereby work of different diameters are clamped between the opposing faces of the block and the carriage in juxtaposition to the drill guide openings.

CHARLES H. WOOLSON.

REFERENCES CITED

The following references are of record in the file of this patent:

UNITED STATES PATENTS

| Number | Name | Date |
|---|---|---|
| 190,042 | Hurd | Apr. 24, 1877 |
| 355,679 | Brewer | Jan. 11, 1887 |
| 1,415,855 | Anderson | May 16, 1922 |
| 1,476,611 | Hines | Dec. 4, 1923 |
| 1,802,914 | Gruber | Apr. 28, 1931 |
| 2,356,591 | Jesionowski | Aug. 22, 1944 |